United States Patent
Dalton et al.

(10) Patent No.: US 6,302,808 B1
(45) Date of Patent: Oct. 16, 2001

(54) METHOD OF MAKING A GOLF BALL WITH A MULTI-LAYER CORE

(75) Inventors: Jeffrey L. Dalton, North Dartmouth; Herbert C. Boehm, Norwell; Christopher Cavallaro, Attleboro, all of MA (US)

(73) Assignee: Acushnet Company, Fairhaven, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/172,608

(22) Filed: Oct. 15, 1998

Related U.S. Application Data

(62) Division of application No. 08/943,932, filed on Oct. 3, 1997, now Pat. No. 6,056,842.

(51) Int. Cl.$^7$ ................................................ A63B 37/06
(52) U.S. Cl. ............................................ 473/371; 473/376
(58) Field of Search .................................. 473/373, 365, 473/376, 371

(56) References Cited

U.S. PATENT DOCUMENTS

| | | |
|---|---|---|
| 1,524,171 | 1/1925 | Chatfield . |
| 1,870,862 | 8/1932 | McKinnon . |
| 2,181,350 | 11/1939 | Smith ................................... 273/62 |
| 2,363,086 | 11/1944 | Ryan ..................................... 154/18 |
| 3,572,721 | 3/1971 | Harrison ............................. 372/218 |
| 3,572,722 | 3/1971 | Harrison ............................. 273/218 |
| 4,076,255 | 2/1978 | Moore et al. ....................... 273/226 |
| 4,272,079 | 6/1981 | Nakade et al. ..................... 273/225 |
| 4,274,637 | 6/1981 | Molitor ........................... 273/235 R |
| 4,321,183 | 3/1982 | Cox et al. ............................ 273/423 |
| 4,337,946 | 7/1982 | Saito et al. ......................... 273/235 |
| 4,431,193 | 2/1984 | Nesbitt ................................ 273/235 |
| 4,556,220 | 12/1985 | Tominaga et al. ................. 273/218 |
| 4,561,657 | 12/1985 | Tominaga et al. ................. 273/218 |
| 4,625,964 | 12/1986 | Yamada .................................. 273/62 |
| 4,650,193 | 3/1987 | Molitor et al. ..................... 273/228 |
| 4,696,475 | 9/1987 | Tomita et al. ...................... 273/227 |
| 4,714,253 | 12/1987 | Nakahara et al. .................. 273/228 |
| 4,781,383 | 11/1988 | Kamada et al. .................... 273/228 |
| 4,783,078 | 11/1988 | Brown et al. ....................... 273/216 |
| 4,848,770 | 7/1989 | Shama ................................. 273/228 |
| 4,858,923 | 8/1989 | Gobush et al. ....................... 273/62 |
| 4,863,167 | 9/1989 | Matsuki et al. ....................... 273/62 |
| 4,919,434 | 4/1990 | Saito .................................... 273/235 |
| 4,955,966 | 9/1990 | Yuki et al. .......................... 273/218 |
| 4,979,746 | 12/1990 | Gentiluomo ........................ 273/220 |
| 4,984,803 | 1/1991 | Llort et al. ....................... 273/235 R |
| 4,998,734 | 3/1991 | Meyer ............................. 273/235 R |
| 5,002,281 | 3/1991 | Nakahara et al. .................. 273/220 |
| 5,019,319 | 5/1991 | Nakamura et al. ................. 273/218 |
| 5,026,067 | 6/1991 | Gentiluomo ........................ 273/220 |
| 5,037,104 | 8/1991 | Watanabe et al. ................ 273/35 R |
| 5,048,838 | 9/1991 | Chikaraishi et al. .............. 273/228 |
| 5,072,944 | 12/1991 | Nakahara et al. .................. 273/220 |
| 5,123,659 | 6/1992 | Williams ........................... 273/60 B |

(List continued on next page.)

FOREIGN PATENT DOCUMENTS

WO 96/40516   12/1996   (WO) .

*Primary Examiner*—William M. Pierce
(74) *Attorney, Agent, or Firm*—Pennie & Edmonds LLP

(57) ABSTRACT

An improved golf ball comprising a center having a first hardness, a first layer surrounding the center, comprised of a second material, a second layer surrounding the first layer, comprised of a third material, a third layer surrounding the second layer, comprised of a fourth material, and a cover of a cover material surrounding the third layer wherein each layer has a different hardness.

16 Claims, 8 Drawing Sheets

U.S. PATENT DOCUMENTS

| | | | |
|---|---|---|---|
| 5,184,828 | 2/1993 | Kim et al. | 273/228 |
| 5,209,485 | 5/1993 | Nesbitt et al. | 273/218 |
| 5,253,871 | 10/1993 | Viollaz | 273/228 |
| 5,273,286 * | 12/1993 | Sun | 473/376 X |
| 5,314,187 | 5/1994 | Proudfit | 273/235 |
| 5,340,112 | 8/1994 | Hamada et al. | 273/226 |
| 5,346,223 | 9/1994 | Hamada et al. | 273/227 |
| 5,367,028 | 11/1994 | Hamada et al. | 273/221 |
| 5,397,129 | 3/1995 | Kato et al. | 525/227 |
| 5,439,227 | 8/1995 | Egashira et al. | 273/228 |
| 5,452,898 | 9/1995 | Yamagishi et al. | 273/220 |
| 5,480,155 | 1/1996 | Molitor et al. | 273/220 |
| 5,482,285 | 1/1996 | Yabuki et al. | 273/228 |
| 5,490,674 | 2/1996 | Hamada et al. | 273/228 |
| 5,540,438 * | 7/1996 | Horiuchi et al. | 473/376 |
| 5,542,680 | 8/1996 | Proudfit et al. | 273/378 |
| 5,553,852 | 9/1996 | Higuchi et al. | 473/373 |
| 5,556,098 | 9/1996 | Higuchi et al. | 473/373 |
| 5,574,107 | 11/1996 | Hiraoka et al. | 473/193 |
| 5,586,950 | 12/1996 | Endo | 473/356 |
| 5,601,502 | 2/1997 | Hiraoka et al. | 473/373 |
| 5,688,191 * | 11/1997 | Cavallaro et al. | 473/373 |
| 5,816,940 * | 10/1998 | Hayashi et al. | 473/365 X |

* cited by examiner

METHOD OF MAKING A GOLF BALL WITH A MULTI-LAYER CORE

CROSS REFERENCE TO RELATED APPLICATION

This is a division of application Ser. No. 08/943,932, filed Oct. 3, 1997 now U.S. Pat. No. 6,056,842.

BACKGROUND OF THE INVENTION

The present invention is directed to improved golf balls and, more particularly, golf balls comprised of multi-layer cores. Generally, golf balls have been classified as wound balls or solid balls. Wound balls are generally constructed from a liquid or solid center surrounded by tensioned elastomeric material. Wound balls are generally thought of as performance golf balls and have a good resiliency, spin characteristics and feel when struck by a golf club. However, wound balls are generally difficult to manufacture when compared to solid golf balls.

Early solid golf balls were generally two piece balls, i.e., comprising a core and a cover. More recently developed solid balls are comprised of a core, a mantle layer and a cover, in order to improve the playing characteristics of the ball.

The prior art is comprised of a variety of golf balls that have been designed to provide particular playing characteristics. These characteristics are generally the initial velocity and spin of the golf ball, which can be optimized for various types of players. For instance, certain players prefer a ball that has a high spin rate in order to control and stop the golf ball. Other players prefer a ball that has a low spin rate and high resiliency to maximize distance. Generally, a golf ball having a hard core and a soft cover will have a high spin rate. Conversely, a golf ball having a hard cover and a soft core will have a low spin rate. Golf balls having a hard core and a hard cover generally have very high resiliency for distance, but are hard feeling and difficult to control around the greens. Various prior art references have been directed to adding a mantle layer or second cover layer to improve the playability of solid golf balls.

Other prior art golf balls have multiple core layers to provide desired playing characteristics. For example, U.S. Pat. No. 5,184,828 claims to provide a golf ball having two core layers configured to provide superior rebound characteristics and carry distance, while maintaining adequate spin rate. More particularly, the patent teaches an inner core and an outer layer and controlling the hardness distribution in the outer layer and in the inner core in such a way that the golf ball has a maximum hardness at the outer site of the inner core. The patent alleges that such a distribution of hardness in the core assembly allows high energy to accumulate at the interface region where the hardness is maximum. The patent further claims that the energy of the club face is efficiently delivered to the maximum hardness region and transferred toward the inner core, resulting in a high rebound coefficient. However, since golf balls having hard cores and soft covers provide the most spin, the distribution taught by this patent would result in a maximum core hardness at the interface when hit by a driver so that the ball has a relatively high driver spin rate and not very good distance. Since the ball in this patent has a softer outer core layer, the ball should have a lower spin rate for shorter shots such as an eight iron, where spin is more desirable. Thus, the ball taught by this patent appears to have many disadvantages.

In order to improve the playing characteristics of a solid golf ball, Kasco, Inc. just introduced a new ball called Rockets®. The Rockets® ball is comprised of a center, two layers and a cover. The center and the two layers are all comprised of polybutadiene rubbers.

In particular, tests on such balls have shown that golf balls are comprised of a center having a diameter of about 1.0 inch, a first layer having an average thickness of about 0.125 inch and a second layer having an average thickness of about 0.13 inch. The center has a Shore C hardness of about 59 at the center and 60 at the center mid point between the core center and the outer surface of the center. The first layer has a Shore C hardness of about 61, and the second layer has a Shore C hardness of about 73. The cover of the Rockets® golf balls are harder than 65 Shore D and the compression is about 88.

Based upon the parting lines at each layer, it appears that Kasco manufactures the Rockets® golf ball core by forming the center, compression molding the first layer around the center and compression molding the second layer onto the center and first layer. It appears that the cover is molded using a retractable pin injection mold. The problem with the Kasco method is that the golf balls thus formed have non-concentric cores. That is, the center of the ball is not concentric with the remainder of the ball and the layers do not have uniform thicknesses. More particularly, the first layer was measured to have a maximum thickness on one side of 0.139 inch and a minimum thickness on the opposing side of 0.106 inch. Thus, there was a variance of 0.033 inch in the thickness of the first layer. Similarly, the second layer was measured to have a maximum thickness of 0.155 on a first side and a minimum thickness of 0.113 inch on the opposing side. Therefore, there was a difference of 0.042 inch in the thickness of the second layer. Thus it is evident that there is a significant concentricity problem in these golf balls.

SUMMARY OF THE INVENTION

The present invention is directed to an improved golf ball having a core comprised of a center and multiple layers to improve the playing characteristics of the golf ball. More particularly, the invention comprises a golf ball having a core and a cover in which the core is comprised of a center and at least three layers surrounding the center. The three layers and the center are preferably comprised of a thermoset rubber such as polybutadiene rubber and provide improved playing characteristics such as spin and overall driving distance. More particularly, the golf ball according to the present invention is comprised of a center having a diameter greater than 1 inch and at least three layers having thicknesses of less than about 0.1 inch each.

The golf balls formed according to the present invention are significantly more concentric than prior art golf balls having multiple core layers. The golf balls as set forth herein also have excellent playing characteristics such as resiliency, spin rates and feel.

DESCRIPTION OF THE PREFERRED EMBODIMENTS

Figure 1:
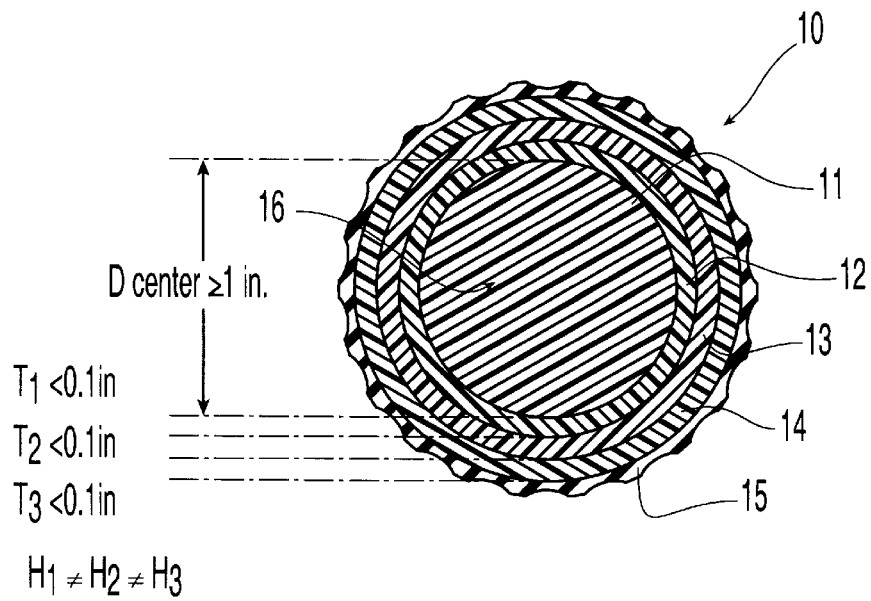
FIG. 1 is a cross-sectional view of a golf ball formed according to the present invention.

Referring to FIG. 1, golf ball 10 includes a center 11, a first layer 12, a second layer 13, a third layer 14, and a cover 15.

The center 11 is preferably formed by compression molding a sphere from a prep of center material. Compression molding solid centers is well known in the art.

Figure 2:
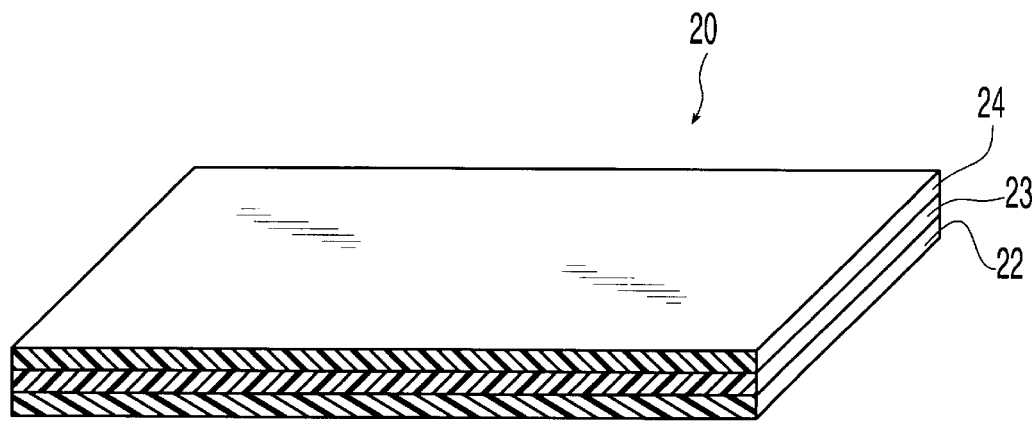
FIG. 2 is a perspective view of a laminate comprising three layers of core material.
Figure 3:
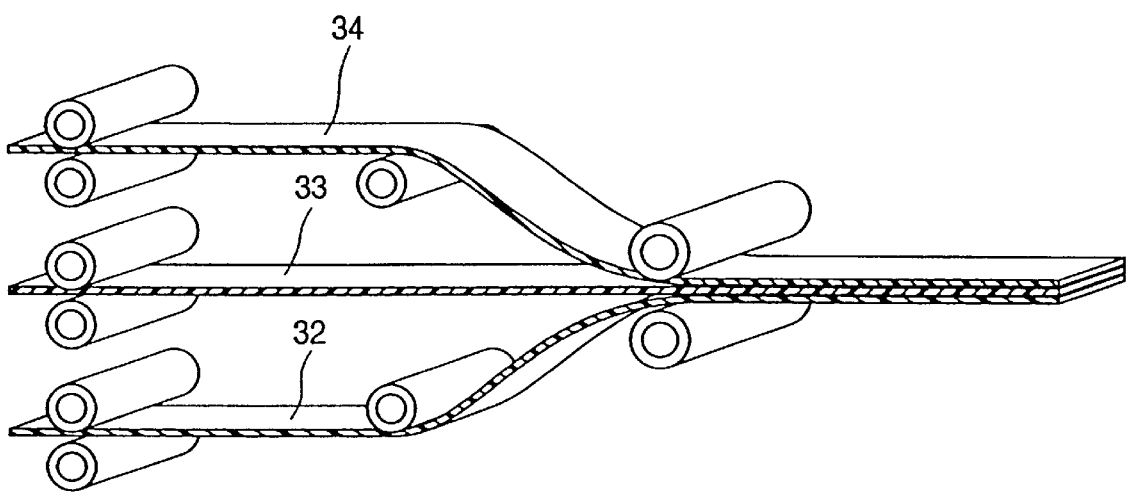
FIG. 3 is a sectional view of rollers and material being formed into the laminate of core material.
Figure 4:
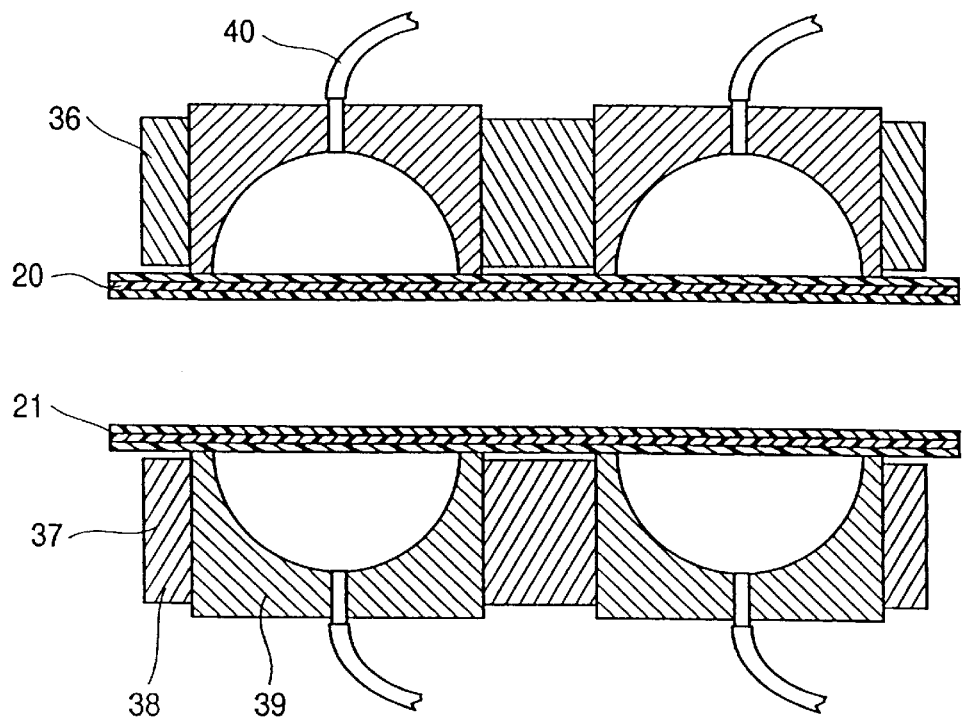
FIG. 4 is a sectional view of a mold for forming multiple layers about a core center according to the present invention.
Figure 5:
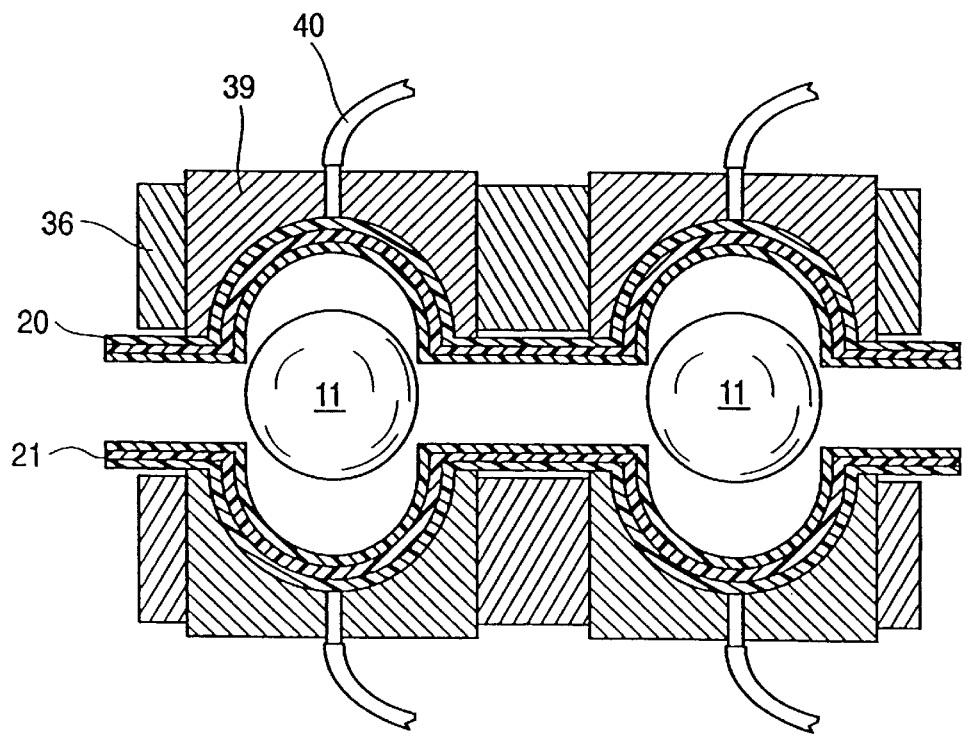
FIG. 5 is a sectional view of a mold forming multiple layers about a core center according to the invention with the mold-forming sheets being vacuum formed within the mold.

Referring to FIGS. 2 and 3, in order to form multiple layers around the center in a first embodiment of the invention, a laminate 20 is formed. The laminate 20 is comprised of at least two layers and preferably three layers 22, 23 and 24. The laminate is formed by rolling thin sheets 32, 33 and 34 from core material. More particularly, each sheet is formed to a thickness that is slightly larger than the thickness of the layers 12, 13 and 14 in the finished golf ball 10. Each of these thicknesses can be varied, but all are preferably less than about 0.1 inch thick. Preferably, the sheets are formed to thicknesses that are less than 0.05 inch and the laminate thickness is less than 0.15 inch.

Preferably, the sheets 32, 33, 34 are prepared by mixing the uncured core material to be used for each layer and calender rolling the material into sheets. The sheets are stacked together to form the laminate 20 having three layers 22, 23 and 24 using calender rolling mills. The sheets could also be made by extrusion. The sheets 32, 33 and 34 should have very uniform thicknesses, i.e., the thickness of each sheet should not vary more than about 0.005 inch.

In an alternate embodiment, the laminate 20 can be further constructed using an adhesive between each layer of material. Preferably, an epoxy resin such as Epoxy Resin #1028 from RBC Industries in Warwick, R.I. is used. The adhesive should have good shear and tensile strength and, preferably the adhesive should have a tensile strength over about 1500 psi. Still further, the adhesive should not become brittle when cured. An adhesive having a Shore D hardness of less than 60 when cured is preferred. The adhesive layer applied to the sheets should be very thin and preferably, less than 0.004 inch thick.

Referring to FIGS. 4 through 7, the next step in the method of the present invention is to form multiple layers around the center. This is preferably accomplished by placing the two laminates 20 and 21 in between a top mold 36 and a bottom mold 37. The molds 36 and 37 are comprised of mold frames 38 and replaceable mold halves 39 such as that described in U.S. Pat. No. 4,508,309 to Brown. The laminates 20 and 21 are formed to the cavities in the mold halves 39. Preferably, the laminates are suction formed by using a vacuum source 40. The vacuum source 40 suction forms the laminates 20 and 21 to the half mold cavities 39 so that uniformity in layer thickness is maintained. Centers 11 are inserted between the laminates after the laminates 20 and 21 have been formed to the cavities and the laminates 20 and 21 are compression molded about the centers 11 under conditions of temperature and, pressure that are well known in the art.

Figure 6:
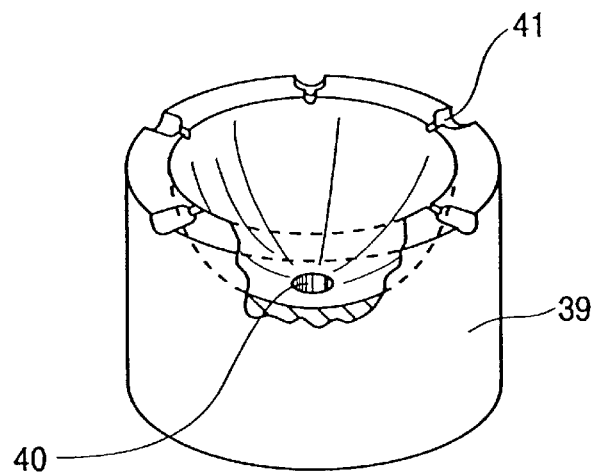
FIG. 6 is a perspective view of a half mold for use in forming multiple layers about core centers according to the present invention.
Figure 7:
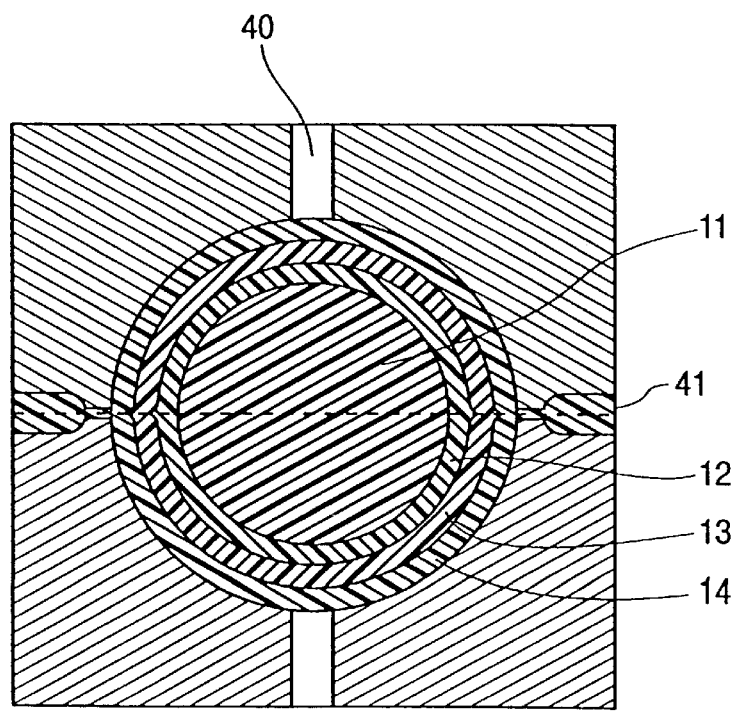
FIG. 7 is a cross-sectional view of a compression mold of a golf ball core according to the present invention.
Figure 8:
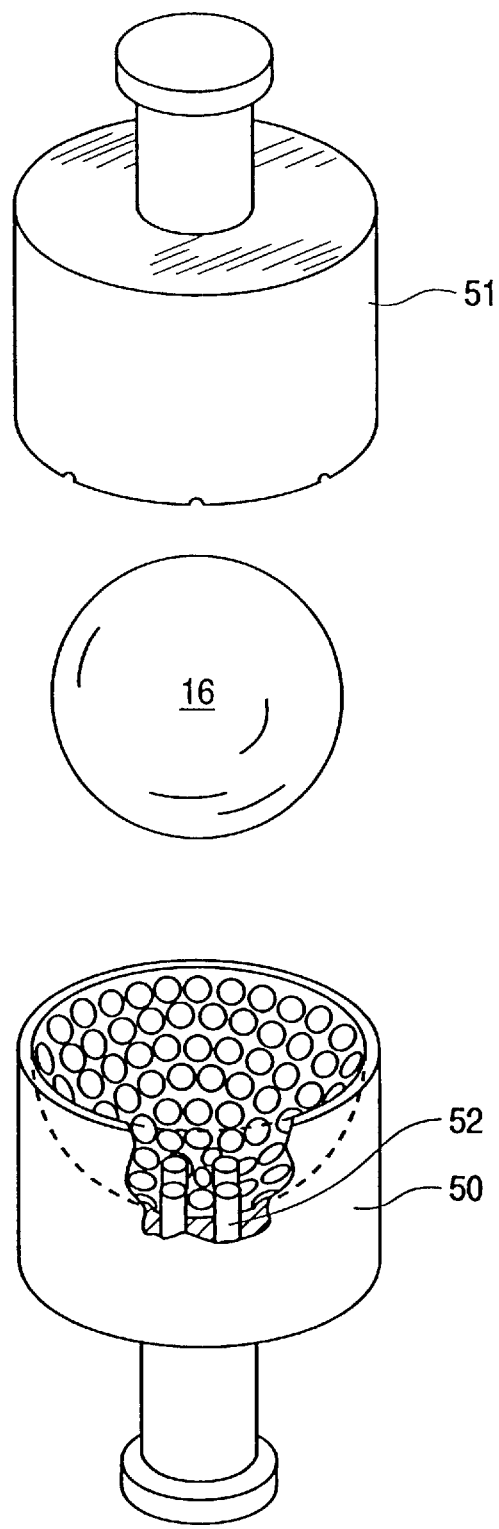
FIG. 8 is an exploded view of a golf ball core according to the present invention in a retractable-pin injection mold.

Referring to FIGS. 6 and 7, the half molds 39 have a plurality of vents 41. The compression molding step includes flowing excess layer material from the laminates 20 and 21 through at least three vents 41 so that the flow of laminate material is symmetrical about the center 11 and the center 11 does not shift due to lateral flow patterns. Preferably, the half molds 39 have 4 to 6 vents.

Referring to FIGS. 8 through 11, the next step in the present invention is to form a cover 15 around the core 16. The core 16, comprised of center 11 and outer layers 12, 13 and 14, is supported within a pair of cover mold-halves 50 and 51 by a plurality of retractable pins 52. These retractable pins 52 are actuated by conventional means known to those of ordinary skill in the art of mold design.

After the mold-halves 50 and 51 are closed together with the pins 52 supporting the core 16, the cover material is injected into the mold in a liquid state through a plurality of injection ports or gates 49. Gates 49 can be edge gates or sub-gates. With edge gates, the resultant golf balls are all interconnected and may be removed from the mold-halves 50 and 51 together in a large matrix. Sub-gating automatically separates the mold runner from the golf balls during the ejection of the golf balls from mold-halves 50 and 51.

Figure 9:
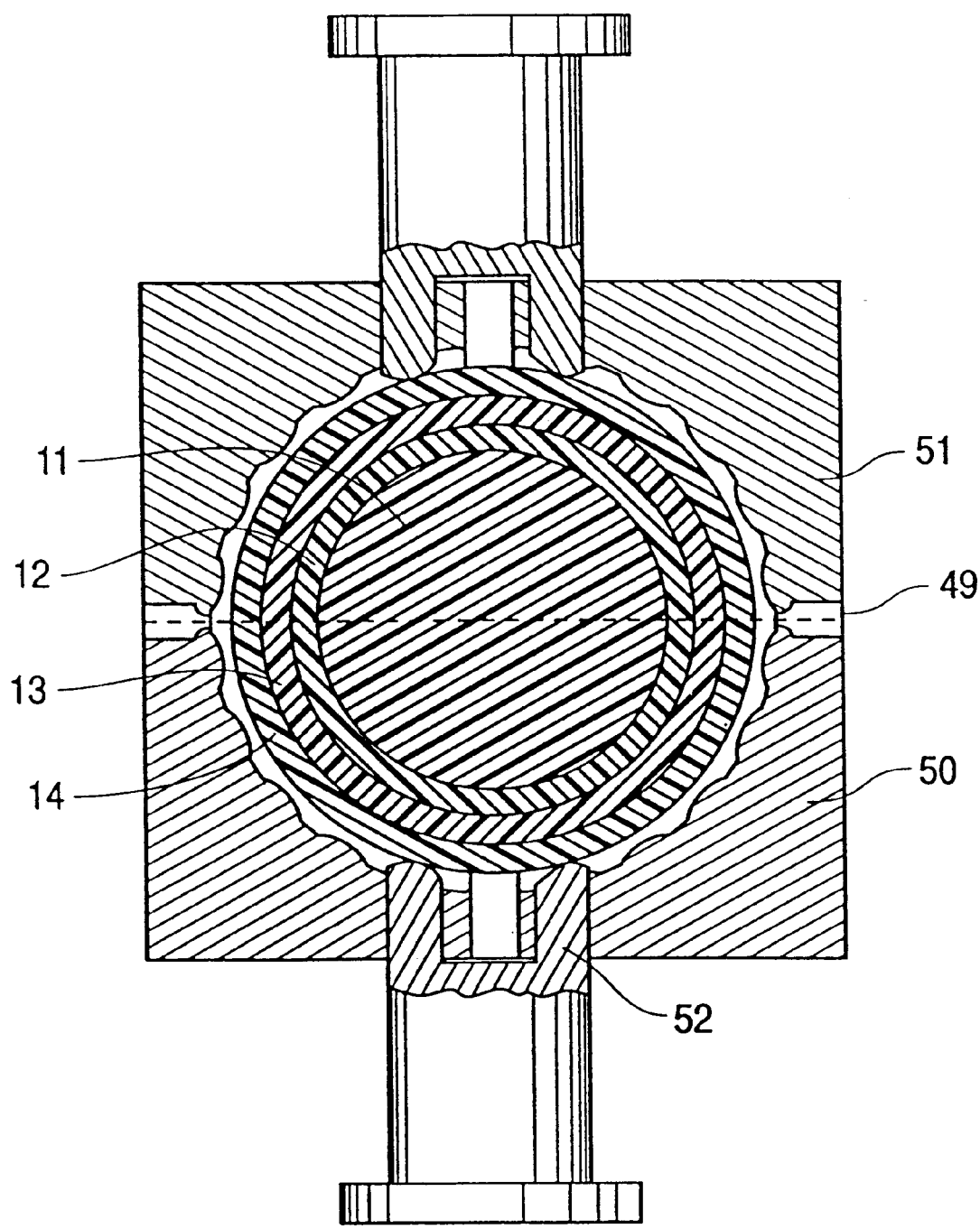
FIG. 9 is a cross-sectional view of a golf ball core according to the present invention in a retractable-pin injection mold.
Figure 10:
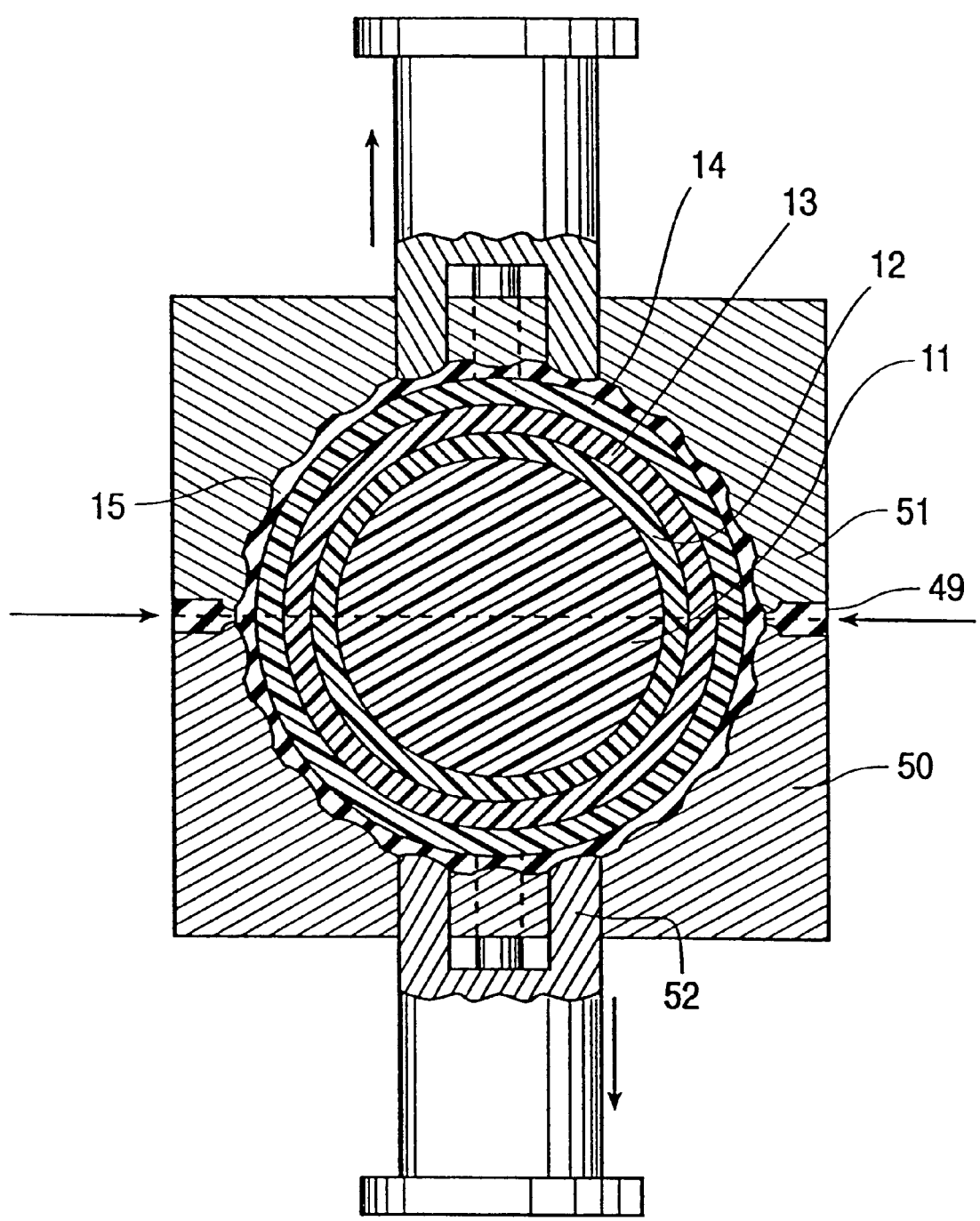
FIG. 10 is a cross-sectional view of a golf ball according to the present invention in a retractable-pin mold.

Referring to FIGS. 9 and 10, retractable pins 52 are retracted after a predetermined amount of cover material has been injected into the mold-halves 50 and 51. The predetermined amount of cover material is substantially all of the material to be injected. Thus, the core 16 is substantially surrounded by cover material and does not shift when the retractable pins 52 are removed. This allows the liquid cover material to flow and substantially fill the cavity between the core 16 and the mold-halves 50 and 51. At the same time, concentricity is maintained between the core 16 and the mold-halves 50 and 51.

The cover material is allowed to solidify around the core 16, thereby forming cover 15. Golf ball 10 is then ejected from mold-halves 50 and 51, and finished using processes which are well known in the art. The temperatures and curing time for mold-halves 50 and 51 are generally known in the art and are dependent on the material that is being used for cover 15, which will be discussed in more detail below.

Figure 11:
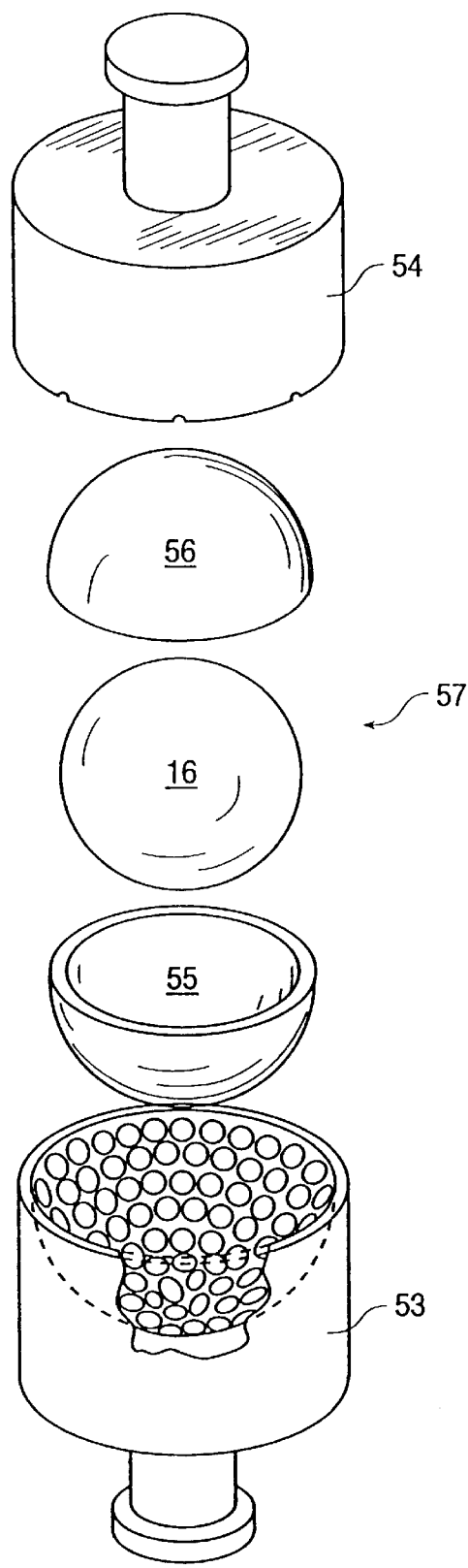
FIG. 11 is an exploded view of a golf ball core according to the present invention with cover layer hemispheres in a compression mold.

Referring to FIG. 11, an alternative method of forming the cover 15 according to the invention is shown. Two cover layer hemispheres 55 and 56 are pre-formed of the desired cover material, preferably, by an injection molding process. The hemispheres 55 and 56 are positioned around core 16 thereby forming an assembly 57. Assembly 57 is placed into a compression mold 58, which comprises two compression mold-halves 53 and 54. Mold-halves 53 and 54 are advanced toward each other until their mating surfaces touch, and the mold 58 is heated to melt the hemispheres. Mold-halves 53 and 54 compress and heat the hemispheres 55 and 56 about the core 16 to mold the cover material thereto.

Referring back to FIG. 1, in a first embodiment, the center 11 and each of the layers 12, 13 and 14 are comprised of a thermoset rubber such as polybutadiene rubber.

In the first embodiment, a golf ball core 16 has a center 11 and three layers 12, 13 and 14. The center diameter should be greater than about 1 inch and, preferably, should be about 1.25 to 1.45 inches. The most preferred center has a diameter of about 1.4 inch. Each of the layers surrounding the center should have a thickness of less than about 0.1 inch and preferably, less than about 0.05 inch. The most preferred thickness of the layers is about 0.03 to 0.05 inch where the thickness of the third layer is equal to or less than the thickness of the first and second layers. Moreover, the center 11 of the golf ball preferably has an outer diameter of greater than 60% of the finished ball 10 diameter. Most preferably, the center 11 has a diameter that is at least 75% of the diameter of the finished ball 10.

A small center of 1 inch or less and relatively thick core layers, each having a thickness of greater than 0.1 inch, decreases ball initial velocity and reduces the ball spin rate effects. When impacting a golf ball with different clubs within a set, the impact speed and the impact angle are changed. On an average, for a tour professional the impact speed of a driver is about 110 miles an hour. The average professional 5 iron impact speed is around 90 miles an hour and the wedge impact velocity is less than about 80 miles an hour. Moreover, the force on the golf ball must be broken up into two components, the normal force that is normal to the club face and the tangential force that is parallel to the club face. Since most professionals use a driver having a loft of about 10 degrees, the tangential force is significantly less than the normal force. However, when using a wedge having a loft between 48 and 60 degrees, the tangential force becomes very significant. For example, experimental data shows that with a clubhead having an impact velocity of about 95 miles an hour and an angle of 20 degrees, a two piece ball has a maximum deflection of about 0.151 inch. When hit with a clubhead at 95 miles an hour and an impact angle of 40 degrees, the ball has a maximum deflection of about 0.128 inch or a difference of 0.023 inch. Thus, the impact deflection depends significantly on the impact angle, and by having outer layers of less than 0.1 inch, the spin characteristics of the ball is altered for different clubs within a set as discussed in more detail below.

For a high spin rate ball that also has good driver trajectory characteristics, the center 11 of the golf ball should have a Shore C hardness of less than about 70. The first layer 12 should be harder than the center 11 and should have a Shore C hardness of about 70 to 75. The second layer 13 should be harder than the first layer 12 and have a Shore C hardness of about 72 to 77. The third layer or outer layer 14 should be harder than the second layer 13 and have a Shore C hardness of about 75 to 80. The cover 15 of the first embodiment golf ball should be a soft cover and have a Shore D of less than 60. Moreover, the center 11, layers 12, 13 and 14 and the cover 15 should be configured to provide a golf ball compression of less than 85 and more preferably, less than about 80.

Table 1 sets forth the contents of the golf ball core in the first embodiment. The compositions used to prepare the golf ball core of this embodiment are all in parts per hundred (pph), based on 100 parts of polybutadiene. The fillers used in the compositions of these examples are regrind and barium sulfate ($BaSO_4$). Vulcup 40KE® and Varox 231XL® are free radical initiators, and are a-a bis (t-butylperoxy) diisopropylbenzene and 1,1-di(t-butylperoxy) 3,3,5-trimethyl cyclohexane, respectively.

The center 11 of the first embodiment golf ball set forth in Table 1, has a Shore C hardness of about 65 at the center point thereof and about 68 at the midpoint between the center and the outer edge. The first layer 12 is harder than the center 11 and has a Shore C hardness of about 71. The second layer 13 is harder than the first layer 12 and has a Shore C hardness of about 73. The third layer or outer layer 14 is harder than the second layer 13 and had a Shore C hardness of about 77. The cover 15 of the first embodiment golf ball is a soft cover and comprised a blend of about 50/50 by weight of very low modules ionomer and a standard ionomer. The golf ball according the this embodiment, has a compression of about 60.

By creating a golf ball core 16 with relatively thin outer layers that progressively get harder, the spin rate of the ball is surprisingly good for a player that desires a high spin rate golf ball. More particularly, when this type of player hits the ball with a short iron, only the outer layer and cover affect the spin rate of the ball. By incorporating a very hard core outer layer and a soft cover, the spin rate is maximized for the short iron shot such as a wedge having an angle of about 48 to 60 degrees. In order to reduce the spin rate a little for middle iron shots such as a 6 iron having aloft of about 32 degrees to make sure that sufficient distance is obtained, the second layer is softer than the third layer. Similarly, to decrease the spin rate, provide good distance and a good trajectory for long irons such as a 3 iron having a loft of about 20 degrees, the first layer 11 is softer than the second layer 12. Finally for a low spin rate with the driver having a loft of about 8 to 12 degrees, the center is made very soft.

In the first embodiment, the center 11 of the core 16 was compression molded to a diameter of about 1.39 inches and each of the three layers, 12, 13 and 14 had a thickness of about 0.03 inch. Solid cores having diameters of about 1.58 inches were also made using the compositions of the core materials set forth in table 1. Cores having the center composition have a compression of about 50. Cores having the first layer composition have a compression of about 75. Preferably, the first layer material will have a core compression that is over 25% greater than the center material core compression. Cores having a second layer composition have a compression of about 85 and thus have a greater core compression than the first layer. Cores having a third layer composition have a core compression of about 110, which is significantly greater than the second layer. Preferably, the third layer core compression is more than 75% greater than the center material core compression.

TABLE 1

| CORE COMPOSITIONS (pph) | | | | |
|---|---|---|---|---|
| Layer No. | Center | 1 | 2 | 3 |
| Polybutadiene | 100 | 100 | 100 | 100 |
| Polywate 325 | 26 | 23 | 18 | 13 |
| Vulcup 40KE ® | .3 | .3 | .3 | .3 |
| Varox 231XL ® | .6 | .5 | .5 | .5 |
| $BaSO_4$ | 31 | 26 | 25 | 25 |
| Zinc Diacrylate | 30 | 32 | 35 | 47 |
| SR-350 | 2 | 2 | 2 | 6 |
| Calcium Oxide | 3 | 0 | 0 | 0 |
| Zinc Oxide | 0 | 3 | 6 | 6 |

All the ingredients except the peroxides were mixed in a Process Lab Brabender mixer to about 180–200° F. The peroxides were added in the second stage to the initial mixture, and the resulting mixture was removed from the Brabender and blended on a lab mill to insure homogeneity. After mixing, the mixture was then hand rolled using a laboratory mill and cut into pieces or "preps". To make the core centers 11, the preps were then compression molded at about 160° C. (320° F.) for about 15 minutes. To fabricate the outer layers, the polybutadiene rubber material was rolled into flat sheets and the sheets were stacked to form a laminate. The laminate was then compression molded around the centers as described above. To form the finished golf balls, the cores were ground and inserted into two cover hemispheres of lithium-sodium blends of SURLYN®.

Preferably, the cover material is comprised of a blend of two materials, a very soft material and a harder material. Preferably, the cover is comprised of about 75 to about 25 parts by weight based on 100 parts by weight resin (phr) of a low flexural modulus ionomer resin; and about 25 to about 75 phr of a standard ionomer resin. Preferred blends are set forth in Table 2 below.

Preferably, the low flexural modulus ionomer is a sodium ionomer resin and constitutes about 40 to 60 phr of the ionomer blend and the standard flexural ionomer is a lithium ionomer resin and constitutes about 60 to about 40 phr of the ionomer blend.

Preferably, the sodium ionomer resin is a copolymer comprising about 95 to about 80 parts by weight of copolymer of ethylene and about 5 to about 12 parts by weight of the copolymer of acrylic or methacrylic acid in which about 10% to about 90% of the acid groups are neutralized by sodium.

Preferably, the lithium ionomer resin is a copolymer comprising about 95 to about 80 parts by weight of ethylene and about 10 to about 16 parts by weight of acrylic or methacrylic acid based on 100 party by weight copolymer. Preferably, the lithium ionomer resin has about 10% to about 90% of the acid groups neutralized by lithium.

Preferably, the low flexural modulus sodium ionomer resin used in the present invention has a flexural modulus between about 1,000 and about 20,000 psi (5 and 140 MPa) and, more preferably, between about 2,000 and about 10,000 psi (10 to 70 MPa).

Preferably, the lithium ionomer resin has a high flexural modulus which is above about 60,000 psi (415 MPa). More preferably, the lithium ionomer resin used in the present invention has a flexural modulus between about 60,000 and about 80,000 psi (415 and 550 MPa). Good results have been obtained with the lithium ionomer resins having flexural moduli in the range of about 60,000 psi to about 70,000 psi (415 to 485 MPa). The flexural modulus is measured in accordance with A.S.T.M. Method D-790.

Both the lithium and sodium ionomer resins preferably have about 10% to about 90% of their carboxylic acid groups neutralized by their respective metal ions. More preferably, both the lithium and sodium ionomer resins have their carboxylic acid groups neutralized about 35% to about 65% by the metal ion.

Preferably, the ionomer resins include the same monocarboxylic acid, e.g. either methacrylic or acrylic acid.

To aid in the processing of the cover stock, it is conventional to use a plurality of ionomer resins to obtain the desired characteristics. Conventionally, ionomer resins with different melt flow indexes are employed to obtain the desired characteristics of the cover stock. In order to adjust the characteristics of the cover stock, other ionomer resins besides sodium and lithium can be employed.

Sodium ionomer resins sold by DuPont under the name SURLYN 8320, SURLYN 8269 and SURLYN 8265 work well in the present invention. Good results have been obtained with a lithium ionomer resins sold under the trade names SURLYN 8118, 7930 and 7940 by DuPont.

SURLYN 8320, SURLYN 8269 and SURLYN 8265 have flexural moduli of 2,800 psi (20 MPa), 2,800 psi (20 MPa) and 7,100 psi (50 MPa), respectively.[1] SURLYN 8118, 7930 and 7940 have flexural moduli of 61,000 psi (420 MPa), 67,000 psi (460 MPa) and 61,000 psi (420 MPa) respectively.

[1]Flexural modulus as published by Dupont.

SURLYN 8118, 7930 and 7940 have melt flow indices of about 1.4, 1.8 and 2.6 g/10 min., respectively. SURLYN 8269 and SURLYN 8265 both have a melt flow index of about 0.9 g/10 min. Melt flow index is measured in accordance with A.S.T.M. Test D 1238, condition E, procedure A. Preferably, the blend of ionomer resins used to make a cover of a golf ball in accordance with the present invention has a melt flow index between about 1 to about 4 g/10 min. and, more preferably, about 1 to about 3 g/10 min.

The combined amount of lithium ionomer resin and sodium ionomer resin used to make a cover in accordance with the present invention as herein described generally makes up at least about 90% by weight of the total weight of the golf ball cover and, preferably, at least about 95% by weight. Additional materials which may be included in the golf ball cover are other SURLYN resins; whitening agents such as titanium dioxide; dyes; UV absorbers; optical brighteners; and other additives which are conventionally included in golf ball covers.

TABLE 2

COVER COMPOSITIONS

| Example No. | 1 | 2 |
|---|---|---|
| SURLYN 8320 | 55% | 45% |
| SURLYN 7940 | 45% | 55% |
| Blend Hardness (Shore D) | 55 | 59 |
| Blend Flexural Modulus (kpsi) | 21.2 | 21.8 |

In a second embodiment, the center 11 and each of the layers 12, 13 and 14 are also comprised of a thermoset rubber such as polybutadiene.

In the second embodiment, the golf ball core also has a center 11 and three layers 12, 13 and 14. The center 11 should be greater than 1.0 inch and, preferably, about 1.25 to 1.45 inches in diameter. The most preferred center has a diameter of about 1.4 inches. Each of the layers should have a thickness of less than about 0.1 inch and preferably, less than about 0.05 inch. The most preferred thickness of each of the layers is about 0.03 inch. Again, by having outer layers of less than 0.1 inch, the spin characteristics of the ball can be altered for, different clubs within a set.

The center 11 of the second embodiment golf ball should have a Shore C hardness of greater than about 75 for low swing speed players. The first layer should be softer than the center and have a Shore C hardness of about 75 to 72. The second layer should be softer than the first layer and have a Shore C hardness of about 73 to 70. The third layer should be the softest and have a Shore C hardness of less than about 70. The cover of the second embodiment golf ball should have good resilience and durability. Preferably, the cover of the second embodiment is a harder cover and is comprised of a blend of about 50/50 by weight of two standard or high acid ionomers. Standard ionomers have about 15 parts by weight of acrylic or methacrylic acid. High acid ionomers have about 17 or more parts by weight of acrylic or methacrylic acid.

By creating a golf ball core 16 with relatively thin outer layers that progressively get softer, the feel and distance is optimized for a low swing speed player. More particularly, when the low swing speed player hits the ball with a short iron, only the outer or third layer and cover are compressed. By utilizing a soft core and a harder cover, the feel of the ball is relatively soft when compared to distance balls having hard covers and hard cores. In order to increase the distance for middle irons while still providing a relatively soft feel, the second layer is made harder than the third layer. Similarly, to provide greater resiliency for long irons, the first layer 11 is harder than the second layer. Finally, for maximum resiliency with the driver, the center is made harder than each of the layers. Since the center 11 is large, i.e., between about 1.25 and 1.45 inches in diameter, the ball has a high compression and initial velocity.

However, since the third layer is soft, the ball provides at surprisingly better feel than hard core/hard cover balls.

The center of the second embodiment, as set forth in Table 3, has a Shore C hardness of about 77. The first layer is softer than the center and has a Shore C hardness of about 73. The second layer is softer than the first layer and has a Shore C hardness of about 71. The third layer is softer than the second layer and has a Shore C hardness of about 68. The cover of the second embodiment golf ball is a harder cover than that used with the first embodiment and is comprised of a blend of about 50/50 by weight of a standard sodium ionomer and a standard lithium ionomer. The cover set forth below has a Shore D hardness of about 65 to 70.

Table 3 sets forth the contents of the golf ball core in the second embodiment. The compositions used to prepare the golf ball core of this embodiment are all in parts per hundred (pph), based on 100 parts of polybutadiene.

In the second embodiment, the center 11 of the core 16 was compression molded to a diameter of about 1.39 inches and each of the three layers, 12, 13 and 14 had a thickness of about 0.03 inch.

TABLE 3

CORE COMPOSITIONS (pph)

| Layer No. | Center | 1 | 2 | 3 |
|---|---|---|---|---|
| Polybutadiene | 100 | 100 | 100 | 100 |
| Polywate 325 | 13 | 18 | 23 | 26 |
| Vulcup 40KE ® | .3 | .3 | .3 | .3 |
| Varox 231XL ® | .5 | .5 | .5 | .6 |
| BaSO$_4$ | 25 | 25 | 26 | 31 |
| Zinc Diacrylate | 47 | 35 | 32 | 30 |
| SR-350 | 6 | 2 | 2 | 2 |
| Calcium Oxide | 0 | 0 | 0 | 3 |
| Zinc Oxide | 6 | 6 | 3 | 0 |

To make the core centers 11, preps were made and compression molded. To fabricate the outer layers, the polybutadiene rubber material was rolled into flat sheets and stacked into a laminate. The laminate was then compression molded around the centers as described above. To form the finished golf balls, the cores were ground and inserted into two cover hemispheres of standard lithium-sodium blends of SURLYN®.

Preferably, the cover material should provide good resiliency and durability. Preferably, the cover is comprised of a blend of two ionomer resins. The cover is comprised of about 75 to about 25 parts by weight based on 100 parts by weight resin (phr) of a sodium ionomer resin; and about 25 to about 75; phr of a lithium ionomer resin. Preferably, the sodium ionomer resin constitutes about 40 to 60 phr of the ionomer blend and the lithium ionomer resin constitutes about 60 to about 40 phr of the ionomer blend. The preferred blend is a 50/50 blend of the sodium and lithium ionomers with additives such as color concentrate.

Preferably, the sodium ionomer resin is a copolymer comprising about 95 to about 80 parts by weight of copolymer of ethylene and about 12 to about 20 parts by weight of the copolymer of acrylic or methacrylic acid in which about 10% to about 90% of the acid groups are neutralized by sodium.

Preferably, the lithium ionomer resin is a copolymer comprising about 95 to about 80 parts by weight of ethylene and about 12 to about 20 parts by weight of acrylic or methacrylic acid based on 100 party by weight copolymer. Preferably, the lithium ionomer resin has about 10% to about 90% of the acid groups neutralized by lithium.

Preferably, the sodium ionomer resin used in the present invention has a flexural modules between about 60,000 and about 80,000 psi (415 and 550 MPa).

The lithium ionomer resin used in the present invention has a flexural modulus between about 60,000 and about 80,000 psi (415 and 550 MPa). Good results have been obtained with the sodium and lithium ionomer resins having flexural moduli in the range of about 60,000 psi to about 70,000 psi (415 to 485 MPa).

Preferably, the ionomer resins incorporate the same monocarboxylic acid, e.g. either methacrylic or acrylic acid.

To aid in the processing of the cover stock, it is conventional to choose from among a plurality of ionomer resins to obtain the desired characteristics.

Conventionally, ionomer resins with different melt flow indexes are employed to obtain the desired characteristics of the cover stock. In order to adjust the characteristics of the cover stock, other ionomer resins besides sodium and lithium can be employed.

Sodium ionomer resin sold by DuPont under the name SURLYN 8920 has worked well in the present invention. Good results have also been obtained with a lithium ionomer resin sold under the trade name SURLYN 7940 by DuPont.

Referring back to the core layers 12, 13 and 14, these can be made of thermosetting or thermoplastic materials. For example, the first, second and third layers 12, 13 and 14 can be formed from thermoplastic elastomers, functionalized styrene-butadiene elastomers, thermoplastic rubbers, thermoset elastomers, thermoplastic urethanes, metallocene polymers, urethanes, or ionomer resins, or blends thereof.

The thermoplastic elastomers include dynamically vulcanized thermoplastic elastomers and blends thereof. Suitable dynamically vulcanized thermoplastic elastomers include Santoprene®, Sarlink®, Vyram®, Dytron® and Vistaflex®. Santoprene® is the trademark for a dynamically vulcanized PP/EPDM. Santoprene® 203-40 is an example of a preferred Santoprene® and is commercially available from Advanced Elastomer Systems.

Examples of suitable functionalized styrene-butadiene elastomers include Kraton FG-1901x and FG-1921x, available from the Shell Corporation. Examples of suitable thermoplastic polyurethanes include Estane® 58133, Estane® 58134 and Estane® 58144, which are available from the B.F. Goodrich Company. Further, the materials for the first, second and third layers 12, 13 and 14 described above may be in the form of a foamed polymeric material. For example, suitable metallocene polymers include foams of thermoplastic elastomers based on metallocene single-site catalyst-based foams. Such metallocene-based foams are commercially available from Sentinel Products of Hyannis, Mass.

Suitable thermoplastic polyetheresters include Hytrel® 3078, Hytrel® G3548W and Hytrel® G4078W which are commercially available from DuPont. Suitable thermoplastic polyetheramides include Pebax® 2533, Pebax® 3533, and Pebax® 1205 and Pebax® 4033 which are available from Elf-Atochem. Suitable thermoplastic polyesters include polybutylene terephthalate.

Suitable thermoplastic ionomer resins are obtained by providing a cross metallic bond to polymers of monoolefin with at least one member selected from the group consisting of unsaturated mono- or di-carboxylic acids having 3 to 12 carbon atoms and esters thereof (the polymer contains 1 to 50% by weight of the unsaturated mono- or di-carboxylic acid and/or ester thereof). More particularly, low modulus ionomers such as acid-containing ethylene copolymer ionomers, include E/X/Y copolymers where E is ethylene, X is a softening comonomer such as acrylate or methacrylate present in 0–50 (preferably 0–25, most preferably 0–2), weight percent of the polymer, and Y is acrylic or methacrylic acid present in 5–35 (preferably 10–35, most preferably 15–35, making the ionomer a high acid ionomer) weight percent of the polymer, wherein the acid moiety is neutralized 1–0% (preferably at least 40%, most preferably at least about 60%) to form an ionomer by a cation such as lithium*, sodium*, potassium, magnesium*, calcium, barium, lead, tin, zinc* or aluminum (*=preferred), or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

Such ionomer resins include SURLYN® and Iotek®, which are commercially available from DuPont and Exxon, respectively. Likewise, other conventional materials such as balata, elastomer and polyethylene may also be used in the first, second and third layers 12, 13 and 14 of the present invention.

Such thermoplastic blends comprise about 1% to about 99% by weight of a first thermoplastic and about 99% to about 1% by weight of a second thermoplastic.

Preferably the thermoplastic blend comprises about 5% to about 95% by weight of a first thermoplastic and about 5% to about 95% by weight of a second thermoplastic. In a preferred embodiment of the present invention, the first thermoplastic material of the blend is a dynamically vulcanized thermoplastic elastomer, such as Santoprene®.

The properties such as hardness, Bayshore resilience, modulus, center diameter and layer thickness of the golf balls of the present invention have been found to affect play characteristics such as spin, initial velocity and feel of golf balls.

The golf ball of the present invention can have an overall diameter of any size. Although the United States Golf Association (USGA) specifications limit the minimum size of a competition golf ball to more than 1.680 inches in diameter, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

While it is apparent that the illustrative embodiments of the invention herein disclosed fulfill the objectives stated above, it will be appreciated that numerous modifications and other embodiments may be devised by those skilled in the art. Therefore, it will be understood that the appended claims are intended to cover all such modifications and embodiments which come within the spirit and scope of the present invention.

We claim:

1. A golf ball comprising:
   a) a center comprised of a first polybutadiene rubber having a first hardness and having a diameter of at least 1 inch;
   b) a first layer surrounding the center, comprised of a second material and having a second hardness and a thickness of less than 0.1 inch;
   c) a second layer surrounding the first layer, comprised of a third material and having a third hardness and a thickness of less than 0.1 inch;
   d) a third layer surrounding the second layer, comprised of a fourth material and having a fourth hardness and a thickness of less than 0.1 inch; and
   e) a cover of a cover material surrounding the third layer;
   wherein each of the first, second and third layers is a solid layer.

2. The golf ball of claim 1, wherein:
   a) the second hardness is different from the first polybutadiene rubber;
   b) the third hardness is different from the first polybutadiene rubber and the second hardness;
   c) the fourth hardness is different from the first polybutadiene rubber, the second hardness and the third hardness; and
   d) the cover material has a fifth hardness different from the first polybutadiene rubber, the second hardness, the third hardness and the fourth hardness.

3. The golf ball of claim 2, wherein each of the first, second and third layers has a thickness less than 0.05 inch.

4. The golf ball of claim 3, wherein the center has a diameter of about 1.25 to 1.45 inch.

5. The golf ball of claim 4 wherein the center, the first, second and third layer materials and the cover material are selected so that the ball has a compression of less than 85.

6. The golf ball of claim 5, wherein the ball has a compression of less than 80.

7. The golf ball of claim 5, wherein:
   a) the center has a Shore C hardness at a center point thereof of less than 70;
   b) the first layer is harder than the center;
   c) the second layer is harder than the first layer; and
   d) the third layer is harder than the second layer.

8. The golf ball of claim 5, wherein:
   a) the first layer has a Shore C hardness of 70 to 75;
   b) the second layer has a Shore C hardness of 72 to 77; and
   c) the third layer has a Shore C hardness of 75 to 80.

9. The golf ball of claim 7, wherein the cover has a Shore D hardness of less than 60.

10. The golf ball of claim 4, wherein the center has a Shore C hardness of greater than 75.

11. The golf ball of claim 10, wherein:

a) the first layer is softer than the center;
b) the second layer is softer than the first layer; and
c) the third layer is softer than the second layer.

12. The golf ball of claim 11, wherein:
a) the first layer has a Shore C hardness of 75 to 72;
b) the second layer has a Shore C hardness of about 73 to 70; and
c) the third layer has a Shore C hardness of less than about 70.

13. The golf ball of claim 1, wherein at least one of the first, second, third and fourth materials are thermoset materials.

14. The golf ball of claim 1, wherein at least one of the first, second, third, and fourth materials comprises a polybutadiene rubber.

15. A golf ball comprising:
a) a solid center comprised of a first polybutadiene rubber having a first hardness;
b) a solid first layer surrounding the center, comprised of a second polybutadiene rubber material and having a thickness of less than 0.1 inch;
c) a solid second layer surrounding the first layer, comprised of a third polybutadiene rubber material and having a thickness of less than 0.1 inch;
d) a solid third layer surrounding the second layer, comprised of a fourth polybutadiene rubber material and having a thickness of less than 0.1 inch; and
e) a cover of a cover material surrounding the third layer.

16. The golf ball of claim 15, wherein:
a) the second material hardness has a different hardness from the first polybutadiene rubber;
b) the third material has a different hardness from the first polybutadiene rubber and the second material;
c) the fourth material has a different hardness from the first polybutadiene rubber, the second material and the third material; and
d) the cover material has a different hardness from the first polybutadiene rubber, the second material, the third material, and the fourth material.

* * * * *